United States Patent [19]
Kang

[11] Patent Number: 5,850,258
[45] Date of Patent: Dec. 15, 1998

[54] HIGH LEVEL VIDEO DECODING APPARATUS CAPABLE OF DECODING VIDEO DATA OF A PLURALITY OF CHANNELS CODED AT A LOWER LEVEL

[75] Inventor: Hwi-sam Kang, Suwon, Rep. of Korea

[73] Assignee: Samsung Electronics Co., Ltd., Kyungki-do, Rep. of Korea

[21] Appl. No.: 618,781

[22] Filed: Mar. 20, 1996

[30] Foreign Application Priority Data

Mar. 21, 1995 [KR] Rep. of Korea ............. 1995 6009

[51] Int. Cl.$^6$ ..................... H04N 7/36; H04N 7/50
[52] U.S. Cl. ............. 348/390; 348/423; 348/555
[58] Field of Search .................. 348/390, 397, 348/407, 448, 467, 473, 556, 402, 423–425, 443–445, 458, 563–568, 555; 364/514 A, 514 R; 375/364; 386/46; H04N 7/36, 7/50

[56] References Cited

U.S. PATENT DOCUMENTS

| | | | |
|---|---|---|---|
| 5,122,875 | 6/1992 | Raychaudhuri et al. | 348/390 |
| 5,148,272 | 9/1992 | Acampora et al. | 348/397 |
| 5,210,611 | 5/1993 | Yee et al. | 348/473 |
| 5,398,074 | 3/1995 | Duffield et al. | 348/564 |
| 5,420,641 | 5/1995 | Tsuchida | 348/556 |
| 5,452,006 | 9/1995 | Auld | 348/390 |
| 5,475,437 | 12/1995 | Song | 348/448 |
| 5,517,250 | 5/1996 | Hoogenboom et al. | 348/467 |
| 5,566,089 | 10/1996 | Hoogenboom | 364/514 A |
| 5,570,197 | 10/1996 | Boon | 386/46 |
| 5,576,765 | 11/1996 | Cheney et al. | 348/407 |
| 5,588,029 | 12/1996 | Maturi et al. | 375/364 |
| 5,594,660 | 1/1997 | Sung et al. | 364/514 R |
| 5,635,985 | 6/1997 | Boyce et al. | 348/402 |

Primary Examiner—Howard Britton
Attorney, Agent, or Firm—Sughrue, Mion, Zinn, Macpeak & Seas, PLLC

[57] ABSTRACT

A decoding apparatus decodes video data coded at a main level or a low level, by using a hardware system adapted for a high level or a high-1440 level according to the MPEG-2 recommendation. The decoding apparatus can decode a greater amount of the video data which has been coded at a level lower than the high level or the high-1440 level, during an interval of time of decoding the data of the high level or the high-1440 level. The decoding apparatus includes a bit buffer memory for storing, by each channel, the video data of a plurality of channels coded at a low level or a main level in a syntactic structure which has been defined by the MPEG-2. The decoding apparatus also includes a parsing unit for performing a parsing operation of a desired channel video data bitstream applied from the bit buffer memory, for storing side information obtained by the parsing results in a side information storage unit store, for reading the side information needed to decode a subsequent decoding operation from the side information storage unit store whenever a channel alteration occurs, and for outputting the read side information together with the coded video data of a new channel, and a decoder for decoding the data supplied from the parsing unit.

12 Claims, 1 Drawing Sheet

HIGH LEVEL VIDEO DECODING APPARATUS CAPABLE OF DECODING VIDEO DATA OF A PLURALITY OF CHANNELS CODED AT A LOWER LEVEL

BACKGROUND OF THE INVENTION

The present invention relates to an apparatus for decoding coded video data, and particularly, to an apparatus having decoding capability for a level recommended by a Moving Pictures Experts Group (MPEG), for decoding video data bitstream of a plurality of channels which has a lower level than the recommended level, on the basis of a syntactic structure of the coded video bitstream.

A high definition television (HDTV) compresses an original signal and processes the compressed signal, because the HDTV has a greater amount of data to be processed compared with a conventional television. To compress and process moving pictures, there have been proposed some techniques such as variable length coding (VLC), quantization, orthogonal transform, and motion prediction. According to the recommendation proposed by MPEG-2 with respect to these techniques, the coded video data is expressed as a video sequence, a group of pictures (GOP), a picture, a slice, and a macroblock, a hierarchy having layers such as blocks, on the basis of the syntactic structure of the coded video data. A profile is used to define a subset of the whole bitstream syntax. Performances of coders and decoders within the boundary imposed by a syntax of a given profile, are subject to a very large amount of variation dependent upon values taken by parameters in the bitstream. To solve such a problem, a level is defined as a set of constraints imposed on parameters within the bitstream. Examples of the profile and the level involving the whole bitstream syntax proposed by the MPEG-2 are shown in the following Table 1.

TABLE 1

| Level | Maximum symbol density | Profile | | | | |
|---|---|---|---|---|---|---|
| | | Simple | Main | SNR | Spatial | High |
| High | Pixel/Line | | 1920 | | | 1920 |
| | Line/frame | — | 1152 | — | — | 1152 |
| | Frame/Second | | 60 | | | 60 |
| High-1440 | Pixel/line | | 1440 | | 1440 | 1440 |
| | Line/frame | — | 1152 | — | 1156 | 1152 |
| | Frame/Second | | 60 | | 60 | 60 |
| Main | Pixel/line | 720 | 720 | 720 | | 720 |
| | Line/frame | 576 | 576 | 576 | — | 576 |
| | Frame/Second | 30 | 30 | 30 | | 30 |
| Low | Pixel/line | | 352 | 352 | | |
| | Line/frame | — | 288 | 288 | — | — |
| | Frame/Second | | 30 | 30 | | |

Regarding applications of the profile and the level shown in Table 1, a main level in a main profile is applied to a conventional television broadcasting signal, and a high level in the main profile is applied to a high efficient coding technology which produces a high resolution and high definition image as in the HDTV. Therefore, a high level coder/decoder has about four times the data processing speed in comparison with a main level coder/decoder.

SUMMARY OF THE INVENTION

Therefore, it is an object of the present invention to provide an apparatus for decoding coded video data having the same syntactic structure as an MPEG recommendation, to enable decoding of a greater amount of the video data coded at a level which is lower than the recommended level during an interval of time required to decode data at the recommended level, using hardware having a data processing capability for the recommended level.

To accomplish the above object of the present invention, there is provided a decoding apparatus having a decoding capability of decoding video data coded at a high level in a predetermined syntactic structure for moving pictures, the decoding apparatus comprising:

bit buffer memory means for storing the video data of a plurality of channels coded at a level lower than the high level in the predetermined syntactic structure, by each channel, and outputting the video data of a desired channel in the form of a bitstream;

side information storage means for storing side information for decoding the coded video data so that the plurality of channels are discriminated from each other;

parsing means for performing a parsing operation of a desired channel video data bitstream applied from the bit buffer memory means by each channel, storing the side information obtained from the parsing results in the side information storage means, reading the side information needed to decode a subsequent decoding operation from the side information storage means whenever a channel alteration occurs, and outputting a video data bitstream which is currently applied from the bit buffer memory means together with the read side information; and decoding means for decoding the data supplied from the parsing means to reconstruct picture data.

BRIEF DESCRIPTION OF THE DRAWINGS

The preferred embodiments are described with reference to the drawing wherein.

DETAILED DESCRIPTION OF THE PREFERRED EMBODIMENT

Figure 1:
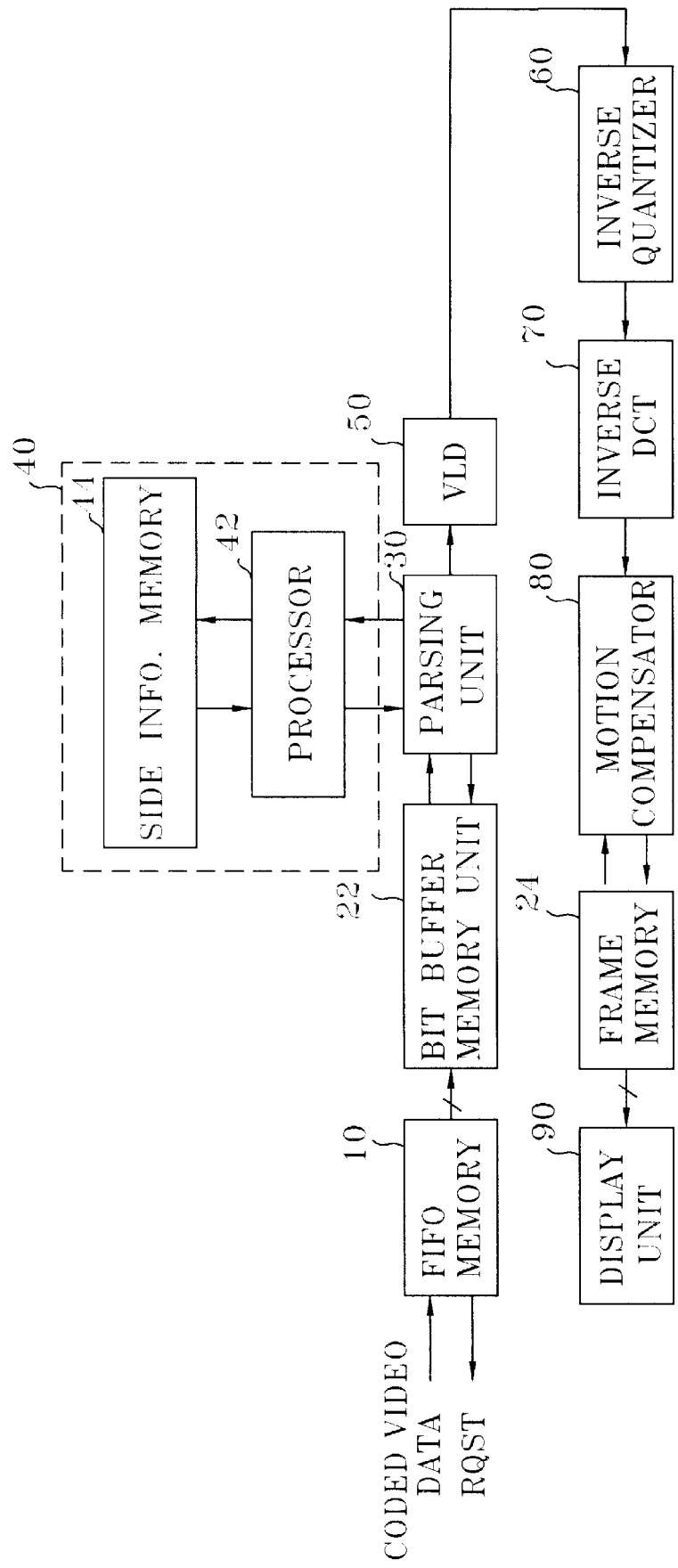
FIG. 1 is a block diagram of a video decoding apparatus according to a preferred embodiment of the present invention.

A preferred embodiment of the present invention will be described below in more detail with reference to the accompanying drawing.

In FIG. 1 showing a video decoding apparatus according to a preferred embodiment of the present invention, the apparatus decodes coded video data according to a syntactic structure which has been basically proposed by the MPEG-2, and has a capability of decoding the coded video data of a high level or a high-1440 level according to the MPEG-2 recommendation. Therefore, the FIG. 1 apparatus can process video data corresponding to a plurality of coded pictures of a main level or a low level which is lower than a high level or high-1440 level during a time when video data corresponding to one picture of the high level or high-1440 level can be processed. The FIG. 1 decoding apparatus includes a first-in-first-out (FIFO) memory 10 which receives the coded video data. The FIFO memory 10 is designed to receive a plurality of low level video data bitstreams corresponding to a plurality of channels. The FIFO memory 10 outputs data in the same manner as a data input sequence, receives a plurality of channel coded video data bitstreams, classifies the video data of the bitstreams by each channel, and stores and outputs the classified video data. The FIFO memory 10 transmits a data request signal RQST to an apparatus such as a storage unit which precedes the FIFO memory 10, if an amount of data stored in the FIFO memory 10 becomes less than a predetermined reference value.

When the above-described high level or high-1440 level coded video data bitstreams are input to the FIG. 1 apparatus, or when the main level or low level coded mono-channel video data bitstream is input thereto, the FIG. 1 apparatus performs decoding of the video data on the basis of side information contained in the input bitstreams. In this case, a bit buffer memory 22 outputs the video data bitstream to a parsing unit 30 in the same sequence as that of the input bitstream. The parsing unit 30 does not parse the input bitstream. The video data passing through the parsing unit 30 is transmitted and processed in sequence by a variable length decoder (VLD) 50, an inverse quantizer (IQ) 60, an inverse discrete cosine transformer (IDCT) 70 and a motion compensator 80. The video data output from the motion compensator 80 is stored in a frame memory 24 and is regenerated via a display unit 90 as necessary.

An operation of the FIG. 1 apparatus will be described below in more detail with respect to a case where the FIG. 1 apparatus decodes the video data of a plurality of channels having a lower level during an interval of time of decoding higher level video data, for example, where it decodes a plurality of pictures of a main level or low level during an interval of time of decoding one picture of a high level or a high-1440 level.

When the low level coded video data of the plurality of channels is transmitted from the FIFO memory 10 to the bit buffer memory unit 22, in the form of the bitstream or bitstreams, the bit buffer memory unit 22 classifies the coded video data supplied from the FIFO memory 10 by each channel and stores the classified video data. With respect to the above-described hierarchy, an amount of data of a particular layer of the high level or high-1440 level is more than that of an identical layer of the main level or low level. Therefore, the bit buffer memory unit 22 can store the data of the plurality of channels of the identical layer of the main level or low level using a memory capacity needed to store the data of the particular layer of the high level or high-1440 level.

The parsing unit 30 generates an output control signal for reading out a video data bitstream of a corresponding channel from the bit buffer memory unit 22, in response to a channel select signal supplied from a controller (not shown). The bit buffer memory unit 22 outputs the video data of a selected channel among the stored video data of the plurality of channels in response to the output control signal, to the parsing unit 30. Here, the video data output from the bit buffer memory unit 22 is in the form of a bitstream. The parsing unit 30 analyzes a syntactic structure contained in the bitstream supplied from the bit buffer memory unit 22. Then, the parsing unit 30 outputs side information obtained from the analyzed result to a side information storage unit 40 and outputs the input bitstream to the VLD 50 as well.

The side information storage unit 40 includes a processor 42 and a side information memory 44. The processor 42 selectively performs a processing which is needed by the FIG. 1 apparatus with respect to the side information supplied from the parsing unit 30, and stores the selectively processed side information in the side information storage unit 40 in the same manner as that to be classified for each channel. Here, processor 42 processes the video data necessary for the decoding process including the processing of a user code contained in the bitstream. The side information is the bitstream data exclusive of picture data and includes a start code and a header of each layer. In an operation of the parsing unit 30, since the general side information in positions higher than a picture layer is necessary when decoding a new slice layer according to a channel change, it is preferable that the parsing unit 30 stores the side information existing in the positions higher than the picture layer in the side information memory 44 of the side information storage unit 40.

The VLD 50 identifies data which is to be variable length decoded, by using the side information contained in the bitstream supplied from the parsing unit 30, and performs variable length decoding of that data. Then, the VLD 50 supplies the data necessary for a subsequent decoding process to the inverse quantizer 60. Therefore, the data supplied to the inverse quantizer 60 includes the variable length decoded data. The inverse quantizer 60 performs an inverse quantization operation of the input data. The inverse discrete cosine transformer 70 performs an inverse DCT operation of the inversely quantized data. The data obtained by the inverse DCT operation is processed by the motion compensator 80. The motion compensator 80 uses data of a reference frame or reference frames to perform the motion compensation operation of the data output from the inverse DCT 70. The frame memory 24 stores the video data reconstructed by the motion compensator 80 by each channel, and outputs the video data of the selected channel to the display unit 90.

If a channel select signal for selecting a new channel is applied via the controller (not shown) at the time when the selected channel video data bitstream is processed through the above procedure, the parsing unit 30 stores a memory address with respect to the currently processed channel video data prior to altering a signal channel to be processed, and then generates an output control signal for reading out a new channel coded video data from the bit buffer memory unit 22. Preferably, the above-described memory address is stored in a memory (not shown) which is incorporated in the parsing unit 30. The present invention is, however, not limited to a case where the memory address is stored. Therefore, the parsing unit 30 can be modified to store the prior-to-channel-alteration memory address in the side information storage unit 40.

The bit buffer memory unit 22 outputs the newly selected channel video data to the parsing unit 30 in response to the memory address supplied from the parsing unit 30. Here, the data output from the parsing unit 30 is processed via the same procedures as those described above, and the completely decoded video data is stored in the frame memory 24.

Meanwhile, if the parsing unit 30 receives a new channel select signal for selecting again the channel which has been processed before, the parsing unit 30 reads out the memory address from the bit buffer memory unit 22 where the video data of which the decoding is interrupted by a channel alteration is stored, and stores the read video data in a memory (not shown). Then, the parsing unit 30 reads out the corresponding video data from the bit buffer memory unit 22 by using the memory address corresponding to the channel which has been processed before. The parsing unit 30 performs a parsing operation of the video data bitstream which is read out from the bit buffer memory unit 22, and supplies the side information obtained by the parsing results to the side information storage unit 40.

When the frame memory 24 stores the decoded video data of the plurality of channels, it is preferable that the display unit 90 is designed to adopt both a method of simultaneously regenerating the decoded video data of at least two channels among the plurality of channels stored in the frame memory 24, and a method of regenerating the video data of one channel only. When the display unit 90 has been designed in this manner, the display unit 90 can simultaneously regenerate the low level video data of the plurality of the channels stored in the frame memory 24 according to a user's manipulation, or regenerate the video data of only one channel.

The bit buffer memory unit 22 and the frame memory 24 are shown as separate blocks in FIG. 1. It is, however, possible that the bit buffer memory unit 22 and the frame memory 24 are implemented in a single memory chip or two memory chips according to a system designer's selection. Although the parsing unit 30 and the VLD 50 have been described as separate blocks, it is preferable that they are incorporated in a single hardware unit in designing the system.

The variable length decoding, the inverse quantization, the inverse discrete cosine transformation and the motion compensation as described above are well known technologies in the prior art disclosing the MPEG-related technology. Thus, the detailed descriptions thereof will be omitted. The technology of displaying a plurality of pictures on a single screen is also known to a person skilled in the art as in examples of a picture-out-picture method and a picture-in-picture method involving a video signal processing technology. Thus, the detailed descriptions thereof will be omitted.

The apparatus of the above-described embodiment apparatus has been designed to be adapted to a case where a channel alteration occurs according to an unshown external controller. A technology of classifying different channels based on the coded video data syntax is, however, known to one having ordinary skill in the art. It is, therefore, within the technical scope of the invention to modify the invention which has been designed to be adapted to a higher level, in order to have the same bit rate as that of the higher level bitstream, and to process a single bitstream in which a relatively lower level coded video data of the a plurality of channels is multiplexed. In this modification, the FIFO memory 10 receives and stores the low level coded video data of the plurality of the channels which are multiplexed into a single bitstream. The video data stored in the FIFO memory 10 is output to the bit buffer memory unit 22 in the same sequence as that of inputting the data. The bit buffer memory unit 22 outputs the video data in the same sequence as that of input one. The parsing unit 30 parses the input bitstream video data, and supplies the side information obtained by the parsing results to the side information storage unit 40. The parsing unit 30 identifies a channel alteration based on the parsing results and takes the side information needed to decode a new channel whenever a channel alteration occurs, from the side information storage unit 40. This modification can decode the lower level coded video data of the plurality of channels without using a separate controller for selecting channel selection. This modification can also decode a greater amount of the lower level coded video data during an interval of time of decoding the higher level video data.

Although the above descriptions have been accomplished with respect to the coded video data having the syntactic structure recommended by the MPEG-2, it will be obvious to those who are skilled in the art that the present invention can be applied to coded video data having a syntactic structure which is created by the same concept as that of the MPEG-2.

As described above, the apparatus of the present invention can almost simultaneously process coded video data of a plurality of channels of a lower level than a level recommended by the MPEG-2, by using a hardware system having a data processing capability for the higher level as in the MPEG-2recommendation. Therefore, the high definition video equipment such as an HDTV receiver can almost simultaneously regenerate a video signal of a plurality of channels having a picture quality of an existing television system. Accordingly, the plurality of channels of existing television video signals can be simultaneously displayed on a single screen.

While only certain embodiments of the invention have been specifically described herein, it will be apparent that numerous modifications may be made thereto without departing from the spirit and scope of the invention.

What is claimed is:

1. A decoding apparatus capable of decoding video data coded at a higher level in a predetermined syntactic structure for moving pictures, said decoding apparatus comprising:

bit buffer memory means for storing video data of a plurality of channels coded at a lower level in said predetermined syntactic structure, by each of the plurality of channels, and outputting the video data of a desired one of the plurality of channels in the form of a bitstream;

side information storage means for storing side information for decoding the video data coded at the lower level so that the plurality of channels are discriminated from each other;

parsing means for performing a parsing operation of a desired channel video data bitstream applied from said bit buffer memory means by each of said plurality of channels, storing the side information obtained by the parsing results in said side information storage means, reading the side information needed to decode a subsequent decoding operation from said side information storage means whenever a channel alteration occurs, and outputting the video data bitstream which is currently applied from said bit buffer memory means together with the read side information; and decoding means for decoding the data supplied from said parsing means to reconstruct picture data.

2. The decoding apparatus according to claim 1, wherein said higher level is one of a high level and a high-1440 level according to a recommendation of the Moving Picture Experts Group (MPEG), and said lower level is one of the high-1440 level, a main level and a low level according to the MPEG recommendation, which is relatively lower than said higher level.

3. The decoding apparatus according to claim 1, wherein said side information storage means stores the side information existing in positions higher than a picture layer of a syntax, proposed by the MPEG, of the coded video data.

4. The decoding apparatus according to claim 1, wherein said parsing means stores a storage position in said bit buffer memory means relating to the coded video data of a channel, the processing of which has been interrupted prior to an occurrence of the channel alteration and reads the coded video data of which the processing has been interrupted by the channel alteration from said bit buffer memory means on the basis of the stored storage position.

5. The decoding apparatus according to claim 1, wherein said bit buffer memory means receives a plurality of bitstream of the lower level video data individually corresponding to the plurality of channels.

6. The decoding apparatus according to claim 5 wherein said parsing means reads the corresponding channel coded video data from said bit buffer memory means according to an external channel select signal.

7. The decoding apparatus according to claim 1, wherein the lower level coded video data of the plurality of channels received by said buffer memory means are multiplexed into a single bitstream.

8. The decoding apparatus according to claim 7 wherein said parsing means recognizes a channel alteration based on the side information contained in the bitstream supplied from said bit buffer memory means, and reads the corresponding channel coded video data from said bit buffer memory means according to the recognition results.

9. The decoding apparatus according to claim 1, wherein said decoding means comprises a frame memory for storing decoded video data corresponding to the plurality of the channels, and which performs a decoding processing of the input video data bitstream including a motion compensation operation by using the side information contained in the bitstream supplied from said parsing means and the decoded video data contained in said frame memory.

10. The decoding apparatus according to claim 9, wherein said frame memory and said bit buffer memory means are designed into a single memory chip.

11. The decoding apparatus according to claim 9, further comprising a display means adapted to simultaneously display the decoded video data of the plurality of channels stored in said frame memory, on a single screen.

12. The decoding apparatus according to claim 11, wherein said display means displays the decoded video data of the plurality of channels stored in said frame memory, on a single screen according to a picture-out-picture method.

* * * * *